US009068762B2

(12) United States Patent
Noton

(10) Patent No.: US 9,068,762 B2
(45) Date of Patent: Jun. 30, 2015

(54) ROOF TILE

(76) Inventor: Edward Lawrence Noton, Kumeu (NZ)

( * ) Notice: Subject to any disclaimer, the term of this patent is extended or adjusted under 35 U.S.C. 154(b) by 0 days.

(21) Appl. No.: 14/114,634

(22) PCT Filed: Apr. 30, 2012

(86) PCT No.: PCT/NZ2012/000057
§ 371 (c)(1),
(2), (4) Date: Oct. 29, 2013

(87) PCT Pub. No.: WO2012/148292
PCT Pub. Date: Nov. 1, 2012

(65) Prior Publication Data
US 2014/0069036 A1 Mar. 13, 2014

(30) Foreign Application Priority Data

Apr. 29, 2011 (NZ) .................................. 592562

(51) Int. Cl.
*E04H 14/00* (2006.01)
*F24J 2/04* (2006.01)
(Continued)

(52) U.S. Cl.
CPC . *F24J 2/045* (2013.01); *E04D 1/04* (2013.01); *E04D 1/24* (2013.01); *F24J 2/0455* (2013.01);
(Continued)

(58) Field of Classification Search
CPC ..... F24J 2/0455; F24J 2002/503; F24J 2/045; F24J 2/50; F24J 2/06; E04D 1/24; E04D 1/04; Y02B 10/20; Y02B 10/22; Y02E 10/44
USPC ....................................................... 52/173.3
See application file for complete search history.

(56) References Cited

U.S. PATENT DOCUMENTS 4,084,576 A * 4/1978 Pei ................................ 126/657
4,359,043 A * 11/1982 Dominique et al. .......... 126/622
(Continued)

FOREIGN PATENT DOCUMENTS

DE 2343016 A1 2/1975
DE 3731237 A1 9/1987
(Continued)

OTHER PUBLICATIONS

International Search Report dated Oct. 15, 2012 from corresponding International Application No. PCT/NZ2012/000057, 4 pages.
(Continued)

*Primary Examiner* — Mark Wendell
(74) *Attorney, Agent, or Firm* — Ohlandt, Greeley, Ruggiero & Perle, LLP.

(57) ABSTRACT

The present invention relates to a tile for a roof or the like comprising a tile body with at least one vacuumed closed space to provide the tile with a thermal insulation barrier for the maintenance of a more stable temperature within an internal roof area. The tile body is manufactured from recycled glass and preferably is formed as foam glass containing a plurality of vacuum containing bubbles. The tile also comprises at least one energy recovery means such as heat absorbing aluminum wafers to provide for heat transfer through conductivity into a hot water supply or voltaic cells to provide for electricity generation. Light is focused onto the energy recovery device by a profiled translucent cover. These and other variations provide for a roof tile which is environmentally friendly, easy to install with improved thermal, energy efficient and sound-proofing qualities.

18 Claims, 16 Drawing Sheets

(51) Int. Cl.
  *E04D 1/04*  (2006.01)
  *E04D 1/24*  (2006.01)
  *F24J 2/06*  (2006.01)
  *F24J 2/50*  (2006.01)

(52) U.S. Cl.
  CPC .... *F24J 2/06* (2013.01); *F24J 2/50* (2013.01); *Y02B 10/22* (2013.01); *Y02E 10/44* (2013.01); *Y02B 10/20* (2013.01)

(56) References Cited

U.S. PATENT DOCUMENTS

| | | | |
|---|---|---|---|
| 4,791,773 A | | 12/1988 | Taylor |
| 4,953,537 A | * | 9/1990 | Allegro .......................... 126/622 |
| 2008/0308093 A1 | * | 12/2008 | Gianasso et al. .............. 126/622 |
| 2009/0220713 A1 | | 9/2009 | Wang et al. |
| 2010/0212719 A1 | | 8/2010 | Stolum |
| 2010/0287852 A1 | * | 11/2010 | Bortoletto .................... 52/173.3 |
| 2011/0096253 A1 | | 4/2011 | Zhang et al. |
| 2014/0041321 A1 | * | 2/2014 | Poivet .......................... 52/173.3 |

FOREIGN PATENT DOCUMENTS

| | | |
|---|---|---|
| DE | 4429264 A1 | 8/1994 |
| DE | 19736002 A1 | 8/1997 |
| DE | 19742066 A1 | 8/1997 |
| DE | 102008039352 A1 | 2/2010 |
| DE | 102010031764 A1 | 7/2010 |
| EP | 0109374 A1 | 5/1984 |
| JP | 2006257783 A | 9/2006 |
| WO | 2005057077 A1 | 6/2005 |

OTHER PUBLICATIONS

Written Opinion dated Oct. 15, 2012 from corresponding International Application No. PCT/NZ2012/000057, 6.
Examination Report dated May 7, 2012 from New Zealand Intellectual Property Office, 2 pages.

* cited by examiner

ROOF TILE

STATEMENT OF CORRESPONDING APPLICATIONS

The present invention is based on the provisional specification filed in relation to New Zealand patent application number 592562, the entire contents of which are incorporated herein.

TECHNICAL FIELD

The present invention relates to roof tiles, roof coverings or the like and methods of making and installing same. In particular, this invention relates to a system for insulating a tile roof, a tile deck or the like and integrated roofing components.

BACKGROUND ART

Roof tiles are designed mainly to keep out weather elements especially rain. Tiles of various compositions have been used since ancient times to provide a protective membrane over building roof structures and are traditionally manufactured from clay. However, modern materials such as concrete and plastic are also used and some clay tiles incorporate a waterproof glaze. Other materials may include brick, stone, wood, metal (ferrous and non-ferrous), bituminous rubber or composite materials.

A typical roofing system comprises sheets of wood, typically plywood or decking material, nailed to the truss rafters to form a pitched roof deck. Typically, the pitched roof deck is overlaid with a roof substrate made of waterproofing material. Typically, the waterproofing material is a membrane made from modified bitumen impregnated fibreglass or polyester fibres. Roof components are primarily secured to the pitched roof deck with mechanical fasteners. Nails are the primary mechanical fasteners for securing roof components to a wood deck. Typically, tile roof components are secured with nails, inserted through holes in the tile roof component, driven into and through the roof substrate and wood deck. Mortar is sometimes used in conjunction with nails to provide holding force of the tile roof component to the roof deck.

It is well known that other typical roofing systems may include tiles which are directly attached to wooden cladding/battens of a roof.

It is also well known that a large proportion of heat can escape from the roof of a building and it has become apparent that over the last decade there has become a real need for a thermal aspect to roofing. In hot climates the ability to reduce the amount of heat entering a roof can result in greater energy efficiency through obviating the need to use air conditioning to a lesser extent.

The 'R-Value' is a measure of thermal resistance used in the building and construction industry. Under uniform conditions it is the ratio of the temperature difference across an insulator and the heat flux (heat transfer per unit area, through it). R-values are given in SI units, typically square-meter Kelvins per watt ($m^2K/W$). Increasing the thickness of an insulating layer increases the thermal resistance. For example, doubling the thickness of fibreglass batting will double its R-value, perhaps from 2.0 $m^2$ K/W for 110 mm thickness, up to 4.0 $m^2K/W$ for a 220 mm of thickness.

Tile manufacturers have been attempting to increase the insulation rating or 'R-Value' of tiles to prevent heat from escaping from the roof of a building. For example, U.S. Pat. No. 7,249,443 relates to an insulated pitched tile roofing system. In particular, the multi-layer component tile system comprises an insulating component which is a board or sheet material, preferably a Styrofoam sheet. The insulating component is preferably adhered to a roofing substrate, if used, or to decking material of a roof deck if the roof substrate is not used. Preferably, the sheet material comprises a substantially flat lower surface and an upper surface. The lower surface is preferably adhered to the roof substrate on the roof deck with a polymer adhesive. The roof tiles are preferably adhered to the upper surface of the sheet material with the polymer adhesive.

However, there are disadvantages associated with this multi-layer component system. The insulating component is not integrated into the tile and requires installation in addition to the roof tile. This is labour intensive requiring excessive installation time and hence increases the cost of installation. Furthermore, Styrofoam insulation material is highly flammable and when burning creates toxic smoke/fumes. Although Styrofoam material provides good insulating properties, it is well known that there are several health issues surrounding Styrofoam insulation such as being a suspected carcinogen. This is primarily due to the presence of certain organic chemicals used in the manufacturing of this material as well as the potential for continued exposure to trace amounts of these chemicals that remain in the finished product.

US 2010/0269440 relates to a roof tile having an integrated insulated foam core covered with a strengthening material (e.g., fibreglass mesh) and a thin outer cement-based protective coating (cured cement slurry). The cement-based protective coating comprises one or more additives to impart water repellent properties to the tile surface. The tile claims to be lightweight, strong, have a high fire-resistance rating, a high insulation rating and can be easily formed into various cross-sectional shapes to increase aesthetic appeal and offer ventilation to the underside of the tiles.

Although the roof tile disclosed in US 2010/0269440 comprises an integrated insulated foam core (which provides insulation and reduces installation costs), a disadvantage is the foam core is manufactured from harmful chemical agents. The present invention discloses that the foam core is expanded polystyrene (EPS). EPS is generally produced from a mixture of about 95% polystyrene and 5% gaseous blowing agent (e.g. pentane). Other types of foam disclosed include high density foam, Styrofoam, polystyrene, MDI monomer, polyurethane resins, extruded foam, expanded plastic foam, polyethylene and nylon.

The Insulite™ roof tile distributed by Insulite Hawaii is a further example of a roof tile that offers an integrated high density (EPS) foam core. Again, the foam is wrapped with a high strength alkaline resistant woven fibreglass mesh and each tile coated with a proprietary high strength cementitious coating. The distributor considers the tile to be lightweight, fire resistant while offering an average insulation value of R-6. However a disadvantage of this product is that the insulation barrier is again manufactured from harmful chemical agents.

Another method to increase the thermal properties of roof tiles is to apply a protective roof coating. For example, Industrial Nanotech, Inc manufacture a thin film insulation coating marketed as Nanusulate. Nansulate utilises a nanomaterial with a low thermal conductivity which allows the coating to inhibit heat transfer in a thin layer. It is recommended that three coats of Nansulate are applied with a brush, roller or paint sprayer for effective coverage. The product is configured for use with concrete or clay tile roofs, slate roof and asphalt or wood roofs.

However, there are disadvantages associated with this product. The application of three coats of the material to provide a thermal barrier is labour intensive (notwithstanding the additional cost associated with purchasing the material). Nansulate also contains non-environmentally friendly Volatile Organic Compounds (VOC).

From the above, it can be seen that it would be advantageous to have a roof tile with thermal insulation properties which is environmentally friendly, non-labour intensive to install and economical to manufacture.

It is an object of the present invention to address the foregoing disadvantages or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a tile for a roof or the like comprising:
a tile body, comprising:
at least one closed space
wherein the at least one closed space is vacuumised such that the closed space provides the tile with a thermal insulation barrier for the maintenance of a more stable temperature within an internal roof area.

Preferably, the tile comprises at least one energy recovery means.

More preferably, the energy recovery means comprises protruding pins to conduct heat from the tile.

More preferably still, the energy recovery means is connected to a closed circuit water system.

In this way the recovered energy can be used to generate heat for a hot water supply system.

Preferably, the tile comprises a mirrored reflective surface or panel configured to reflect heat.

More preferably, the energy recovery means is an aluminium or copper surface.

In this way the recovered energy can be used to reflect heat back into the outer face of the tile to induce snow melt.

More preferably, the energy recovery device is a voltaic closed space.

More preferably, the voltaic closed space(s) include electrical connectors (positive and negative) connected to a grid rod configured to supply electricity to an energy sink.

In this way, electricity generated from the tile can be stored in a battery bank inverter system or supply energy to a national grid.

More preferably, the energy recovery means is a photo sensitive liquid crystal element configured to reflect energy externally from the roof in light conditions and to the roof area during dark conditions to reflect energy back into a building.

More preferably, the energy recovery means, voltaic closed space and/or the photo sensitive liquid crystal element is housed in one of the at least one closed space.

More preferably still, the closed space in which the energy recovery means, voltaic closed space and/or the photo sensitive liquid crystal element is housed, is sealed with a translucent cover.

More preferably still, the translucent cover is configured to focus light onto the energy recovery means.

More preferably still, the translucent cover configuration is selected from the group consisting of: convex, concave or multi-pyramid profile.

Preferably, wherein the tile body is manufactured from foam glass.

Preferably, the tile body is manufactured from recycled glass.

According to a further aspect of the present invention there is provided a method of manufacture of a tile for a roof or the like comprising the steps of:
a) forming a tile body comprising at least one closed space; and
b) vacuumising the at least one closed space such that the closed space provides the tile with a thermal insulation barrier.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Single Vacuum Closed Space Tile

A first preferred embodiment of the present invention is depicted in FIGS. 1-15.

Throughout the present specification the terms "roof tile" and "tile" should be understood to mean an individual element generally of industry dimensions configured to be arranged, along with a plurality of like elements, either in an overlapping or non-overlapping relationship to each other to form a waterproof covering or membrane over a building structure. In particular, the building structure may be a roof, but this should not be seen as limiting. For example, the "tile" may be used on an exterior wall of a building, an external deck or a flat roof.

Assembled Tile Body

Figure 1:
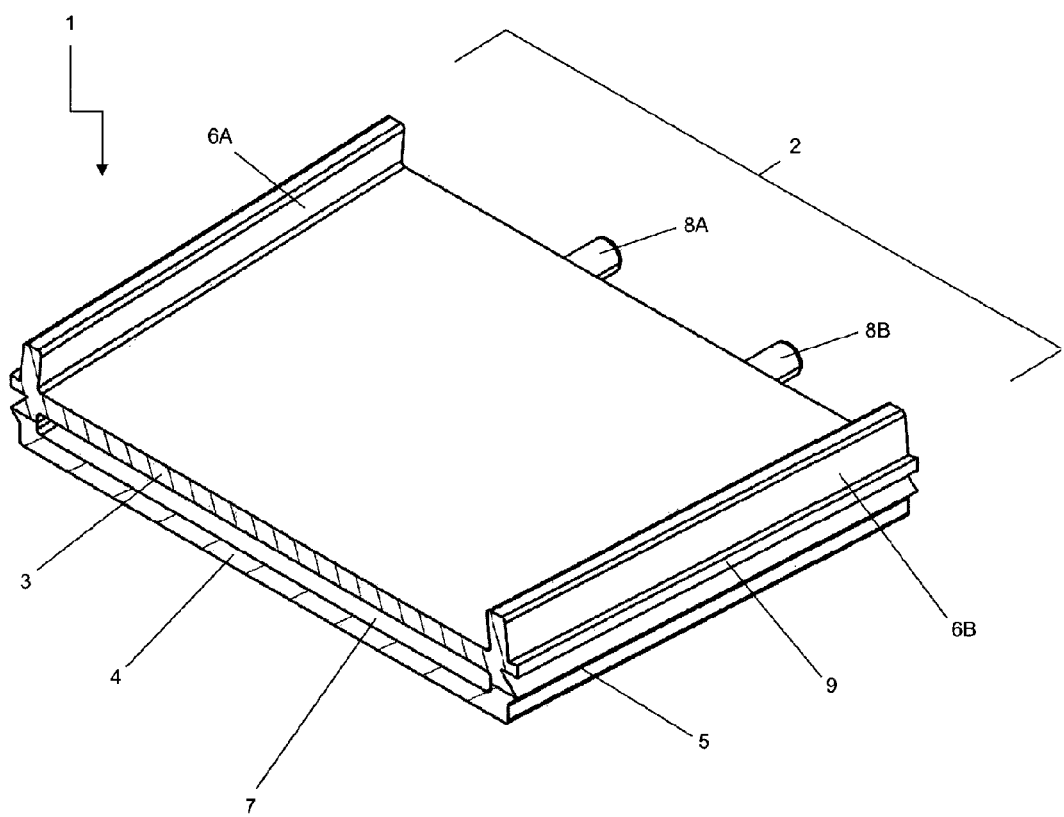
FIG. 1 shows a cross-sectional perspective view of an assembled tile according to a first preferred embodiment of the present invention in the form of a single closed space tile.
Figure 2:
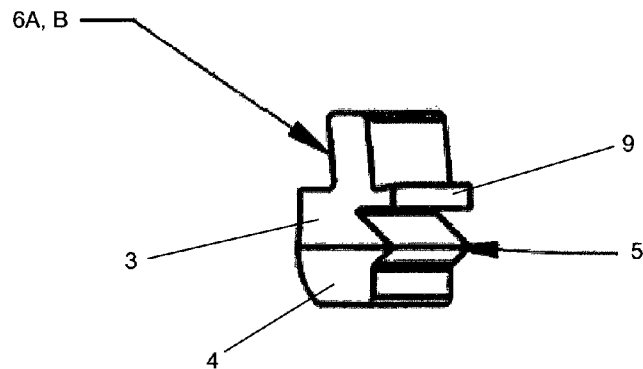
FIG. 2 shows a cross-sectional view of the sealing edge detail of FIG. 1.

With reference to FIG. 1, a cross-sectional perspective view of an assembled tile (1) is shown with body (2). The body (2) of the tile (1) is manufactured from silica or recycled glass. The glass is tempered, laminated or wire embedded to comply with building codes in relevant jurisdictions. The advantage of recycled glass or silica is that it is an environmentally sustainable material and allows for additional functionality of the tile (1) as described in further detail later in the specification.

It should be appreciated by those skilled in the art that the method of construction of the tile (1) can vary using known processes such as casting, pressing, extrusion, pultrusion, blown, float or lamination. These are well known processes used in the industry and need not be described further in this specification.

In this preferred embodiment, the body (2) of tile (1) comprises a top section (3) (outside visual face) and a bottom section (4) which are joined together at the sealing edge (5). The sealing edge (5) completely encircles the side edges of the tile (1) and is melt sealed (best seen in FIG. 2). Other sealing methods may include, but are not limited to glue or gasket sealing. The top section (3) comprises two upstanding portions (6A,B) which form two functions. The first function is to provide for a weather proof upstand to allow water to run off the tile (1). Also, the upstands (6A,B) of the top section (3) are tapered inwardly as the second function of the upstands (6A,B) are to locate a capping tile (not shown) for additional weather proofing.

The formed assembled tile (1) comprises a closed space (7) located between the inner face of top section (3) and outer face of bottom section (4). The closed space (7) is vacuumised in known fashion following post manufacture through corresponding evacuation tubes (8A,B) and is sealed by melt or plug.

Tile Top Section

Figure 3:
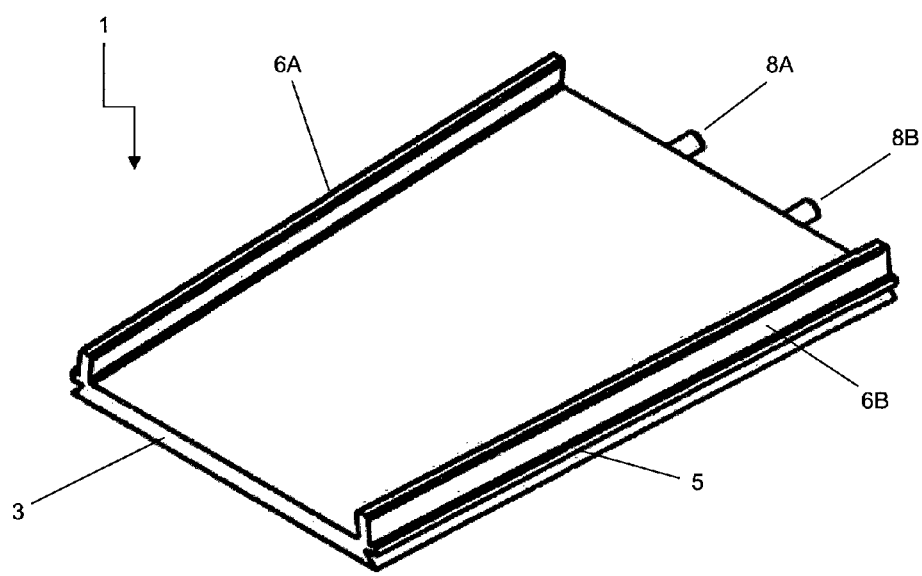
FIG. 3 shows a perspective view of the top section of the tile of FIG. 1.
Figure 4:
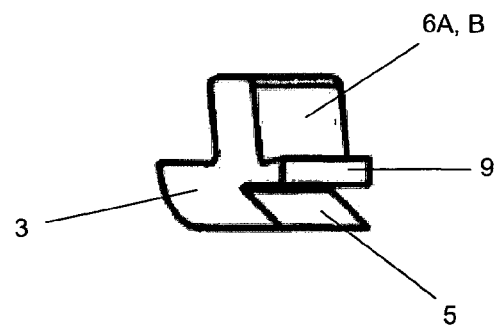
FIG. 4 shows a cross-sectional view of the side detail of the top section of the tile depicted in FIG. 1.

FIG. 3 shows a perspective view of the top section (3) of the tile (1) which is formed with two weather proof upstands (6A,B) along the upper side edges. The side edge detail of the top section (3) comprises an edge (5) and is best seen in FIG. 4. This edge (5) corresponds to the edge of the bottom section (4) for melt sealing of the face of the two sections. In alternative embodiments, the edge (5) may be the holding face for a gasket type seal, or glued to ensure an airtight chamber for vacuumising the closed space (not shown). The top section (3) comprises a protruding edge (9) on each side of the tile (1) which are configured to be adjacent assembled tile sections in a roof.

Figure 5:
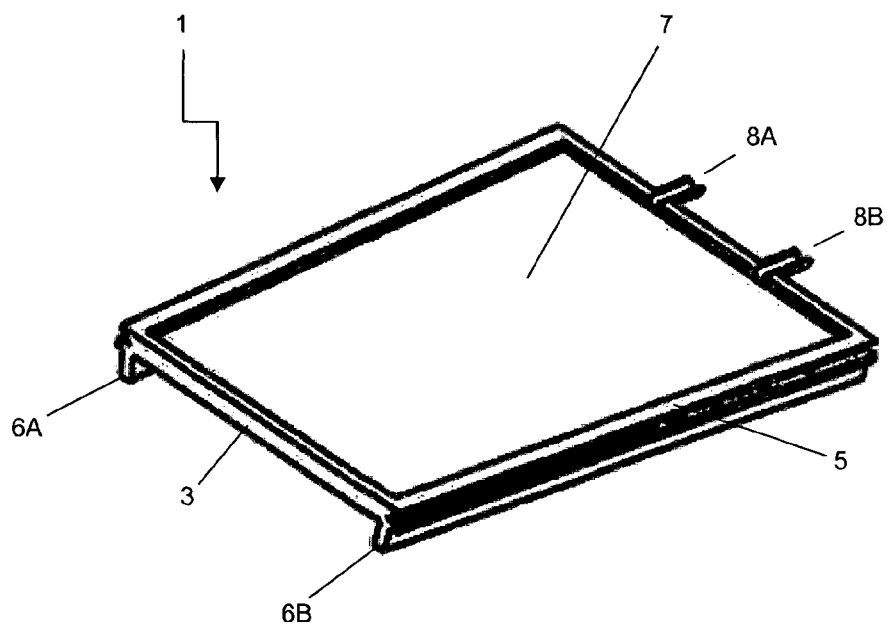
FIG. 5 shows an underside view of the top section depicted in FIG. 3.

FIG. 5 shows the same embodiment as shown in FIG. 3, but is an underside view showing closed space (7) detail and evacuation tubes (8A,B) leading into the closed space (7) for vacuumising the closed space (7).

Tile Bottom Section

Figure 6:
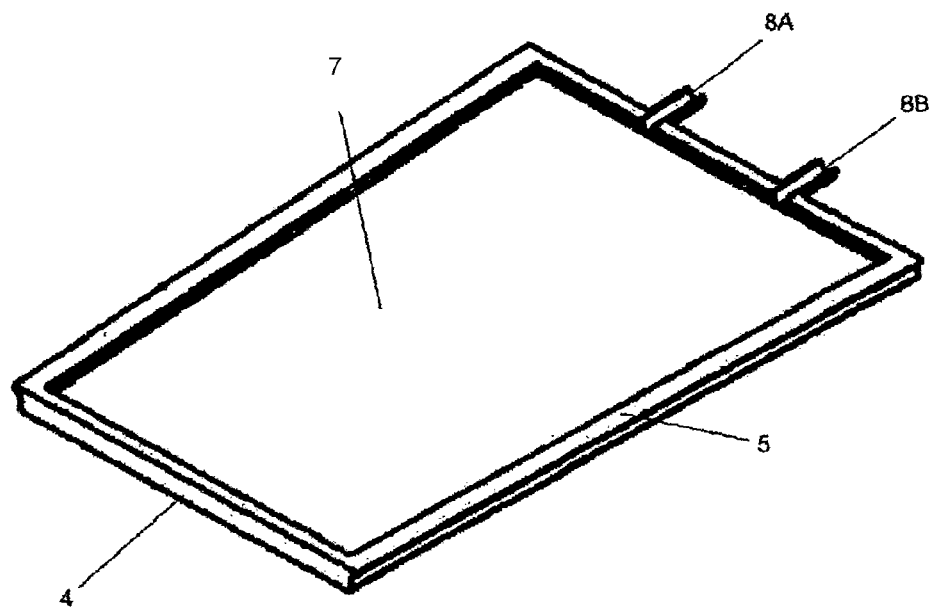
FIG. 6 shows a perspective view of the bottom section of the tile of FIG. 1.
Figure 7:
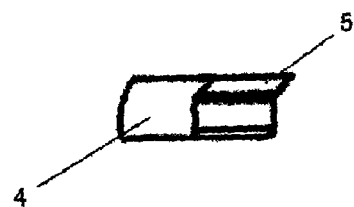
FIG. 7 shows a cross-sectional view of the side detail of the bottom section of the tile depicted in FIG. 1.

With reference to FIG. 6, a perspective view of the bottom section (4) of the tile (1) is shown with sealing edge (5) which corresponds with the edge of the top section (3) for melt sealing of the face of the two sections. The side edge detail of the bottom section (4) is best seen in FIG. 7. The bottom section (4) comprises a corresponding closed space (7) and evacuation tubes (8A,B) to match that of the top section (3), when sealed and assembled. It is envisaged that the bottom section (4) can be manufactured out of opaque glass (of any colour) to add additional ambiance to the visual appearance of the roof.

Installation of Assembled Roof Tile

Fastener

Figure 8:
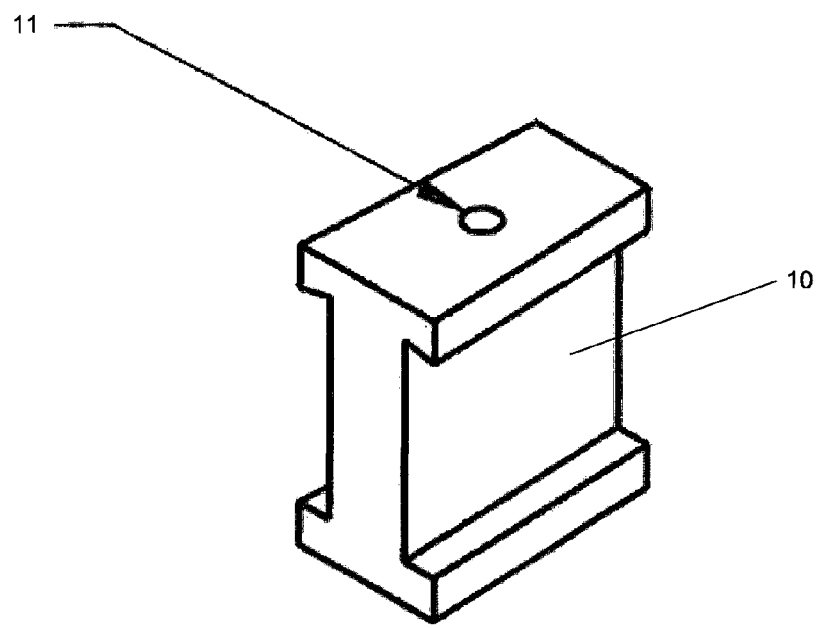
FIG. 8 shows a perspective view of the fastener utilised in a preferred embodiment of the present invention.

The installation of the roof tile is placed on battens in known fashion and this method of installation need not be described in detail throughout this specification. However, for ease of installation, the assembled roof tile (1) is attached to the roof by means of a locating fastener (10) as shown in FIG. 8. The fastener is configured to attach to the protruding edge (9) by an interference fit and a screw is inserted into the aperture (11) of the fastener (10) firmly holding the two adjacent tiles into place at the required spacings.

An advantage of using this fastening means is that it allows for expansion and contraction without causing stress to the tile. Also, this method of attachment minimises breakage of the tile (as per nailing of conventional tiles) and screwing of the fastener provides a more secure method of attachment.

Following the alignment and securing of the tiles, the adjacent gap between the tiles is covered by a locking cap tile.

Locking cap tile

Figure 9:
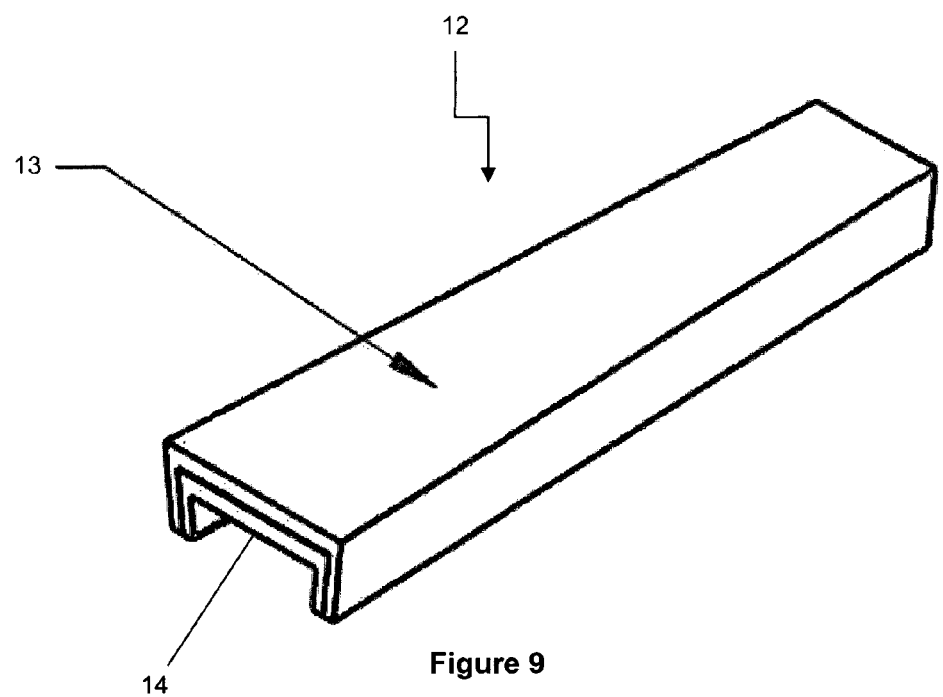
FIG. 9 shows an assembled locking cap for use in a preferred embodiment of the present invention.
Figure 10:
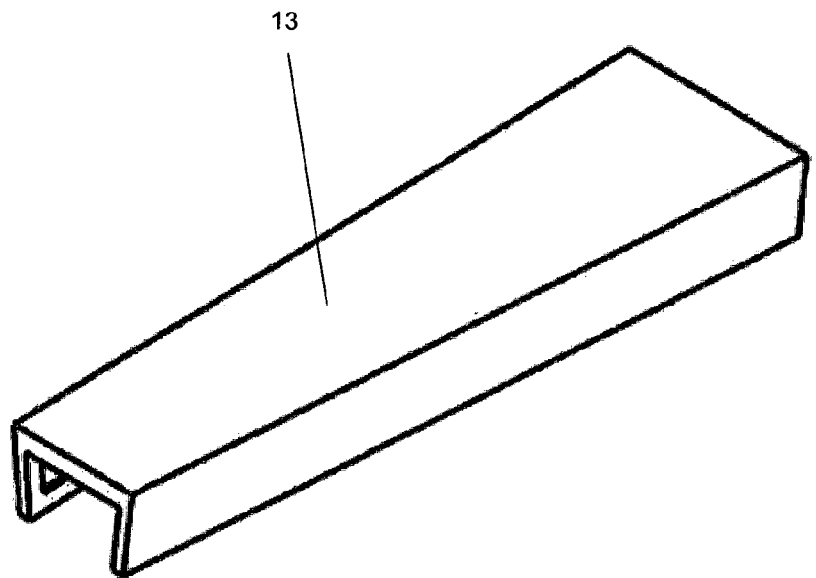
FIG. 10 shows a perspective view of a top locking cap of FIG. 9.
Figure 11:
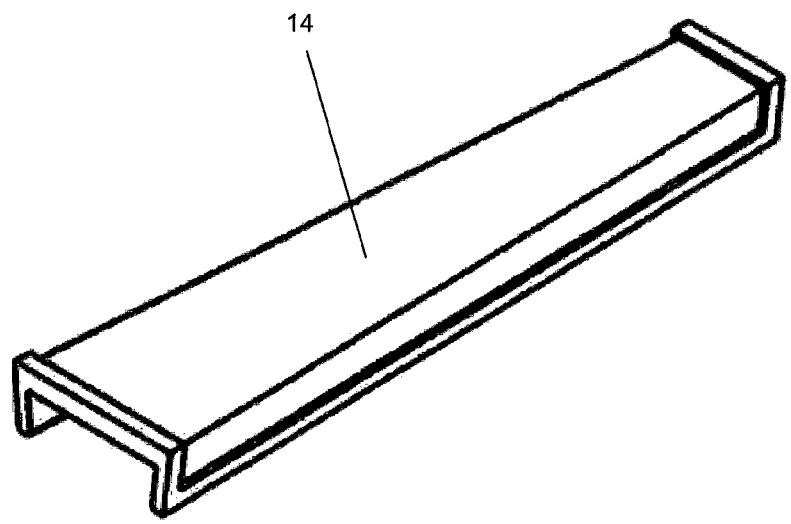
FIG. 11 shows a perspective view of a bottom locking cap of FIG. 9.

With reference to FIGS. 9, 10 and 11 a locking cap (12) is shown. FIG. 9 shows an assembled locking cap (12) comprising a top locking cap (13, best seen in FIG. 10) and a bottom locking cap (14, best seen in FIG. 11).

The locking cap (12) is manufactured by the same method and material as per the tile (1). For use, the locking cap (12) is assembled by engagement of the top locking cap (13) with the bottom locking cap (14) by creating a vacuum and sealing. Once assembled, the locking cap (12) is fastened to the tile (1) by sliding over and engaging with the corresponding upstands (6A,B) of the tile (1). The locking cap (12) is tapered in both the horizontal and vertical planes to match the profile of the tapered tile (1).

Completed Tile Section and Design

The tile embodiment described above and shown in FIGS. 1 to 11 depicts an exemplary flat tapered profile design with a wider end at the top which narrows at the base. An advantage of this design profile is that it can provide a roof installer with added foot protection during installation as a wedge effect is created with the corresponding locking caps (12) on the downward slope allowing roofing shoes to obtain a better foot hold.

Figure 12:
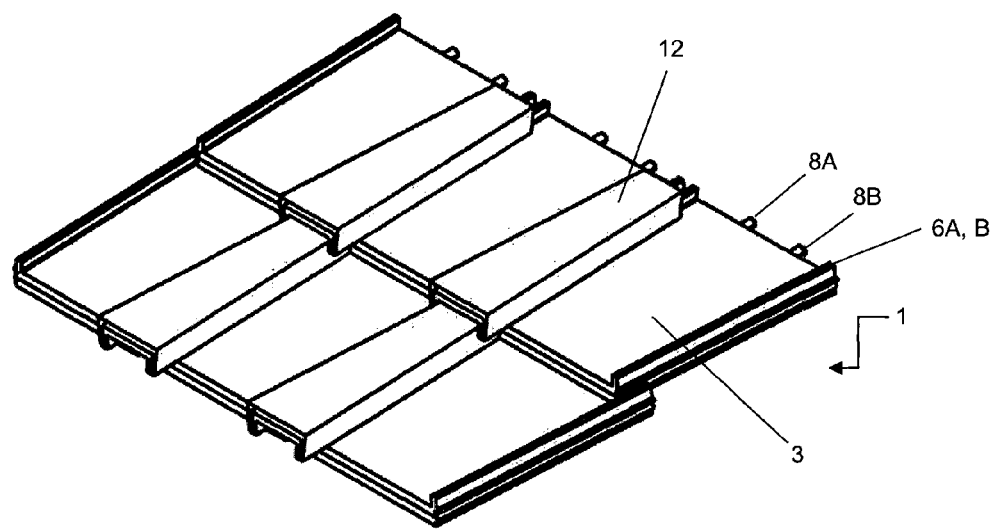
FIG. 12 shows an exemplary flat tapered design of a six tile segment of a partially completed roof section.

An exemplary flat tapered design of a six tile segment of a partially completed roof is shown in FIG. 12 with locking caps. However, it should be appreciated by those skilled in the art that other tile designs either for aesthetic, retrofitting or other structural considerations could conceivably used with this invention. The tile may be colour matched to meet any design parameters and colours selected as a function of performance. For example, the top face of the tile may be clear to translucent to collect light and the bottom face may be black or silver to either absorb or reflect heat back into a building.

Figure 13:
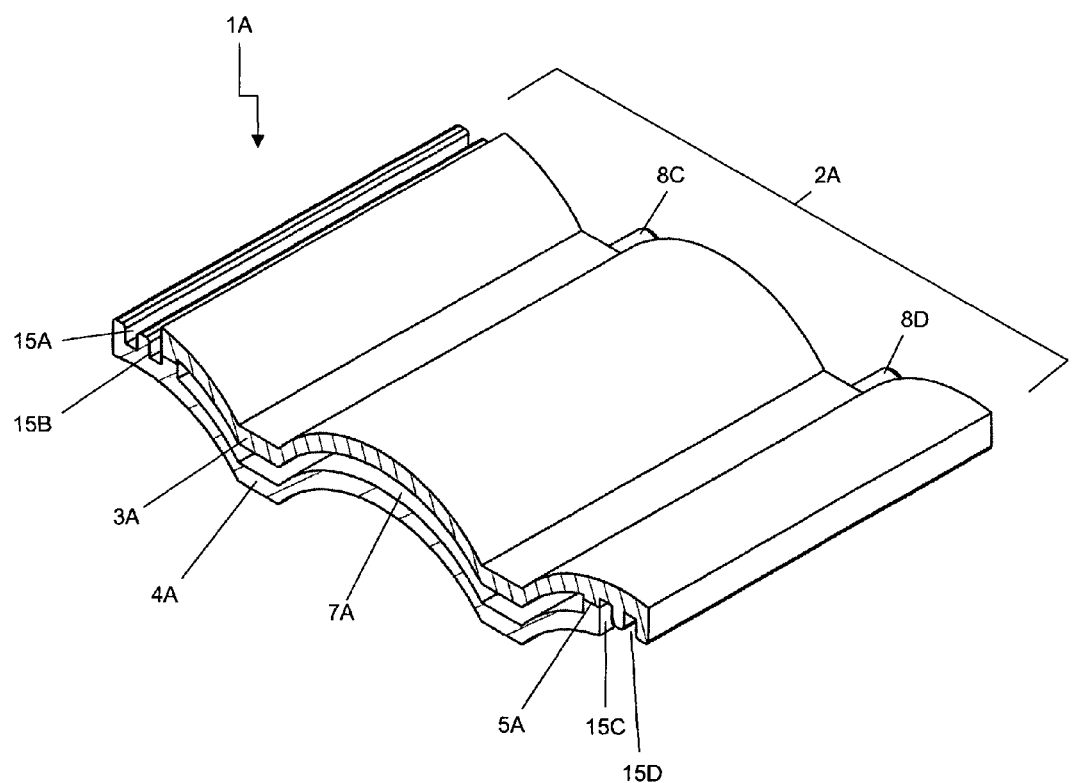
FIG. 13 shows an alternative embodiment of an assembled tile design configured to retrofit existing roof tile profiles.

As a further example of alternative designs, FIG. 13 shows a cross-sectional perspective view of an assembled tile (1A) design which has been manufactured to retrofit/be a replacement for existing roof tile profiles. The body (2A) of the tile (1A) is also manufactured from silica or recycled glass. It is envisaged that the tile designs configured with a vacuum closed space may be profiled to match existing tile manufacturers' designs so that they can either be offered to their range of tiles or sold as replacement tiles.

In this alternative embodiment, the body (2A) of tile (1A) also comprises a top section (3A) (outside visual face) and a bottom section (4A) which are joined together at the sealing edge (5A). Again, the sealing edge (5A) completely encircles the side edges of the tile (1A) and is melt sealed. The top and bottom sections (3A and 4A) include corresponding channels (15A, B, C and D) configured to adjoin adjacent tile segments. The formed assembled tile (1A) comprises a closed space (7A) located between the inner face of top section (3A) and outer face of bottom section (4A). The closed space (7A) is vacuumised in known fashion following post manufacture through corresponding evacuation tubes (8C,D) and sealed by melt or plug.

Additional Tile Functionality

A primary function of the roof tile disclosed in this specification is to provide a roof tile with a vacummised closed space such that the closed space provides the roof tile with a thermal insulation barrier. However, the closed space is multi-functional as it also provides sound proofing characteristics for the dampening of rain/hail and other external noises. In addition to this, the closed space provides a location to integrate energy recovery devices or the like which should not be seen as limited to the following examples:

Reflection of heat

The tile may include a mirrored reflective surface or panel configured to reflect heat away from a building. Reflecting the heat is advantageous in hot climates and the panel is protected from the elements in the vacuum closed space.

Heat conductor

The tile may include a heat conductor such as a heat absorbing plate. For example, a heat absorbing plate manufactured from aluminium or copper with protruding pins could be used to conduct heat away from the tile which is connected to a closed circuit water system to generate heat for a hot water supply system. An advantage of this system is that there is no air in the system to reducing heat loss and therefore is very efficient.

Figure 14:
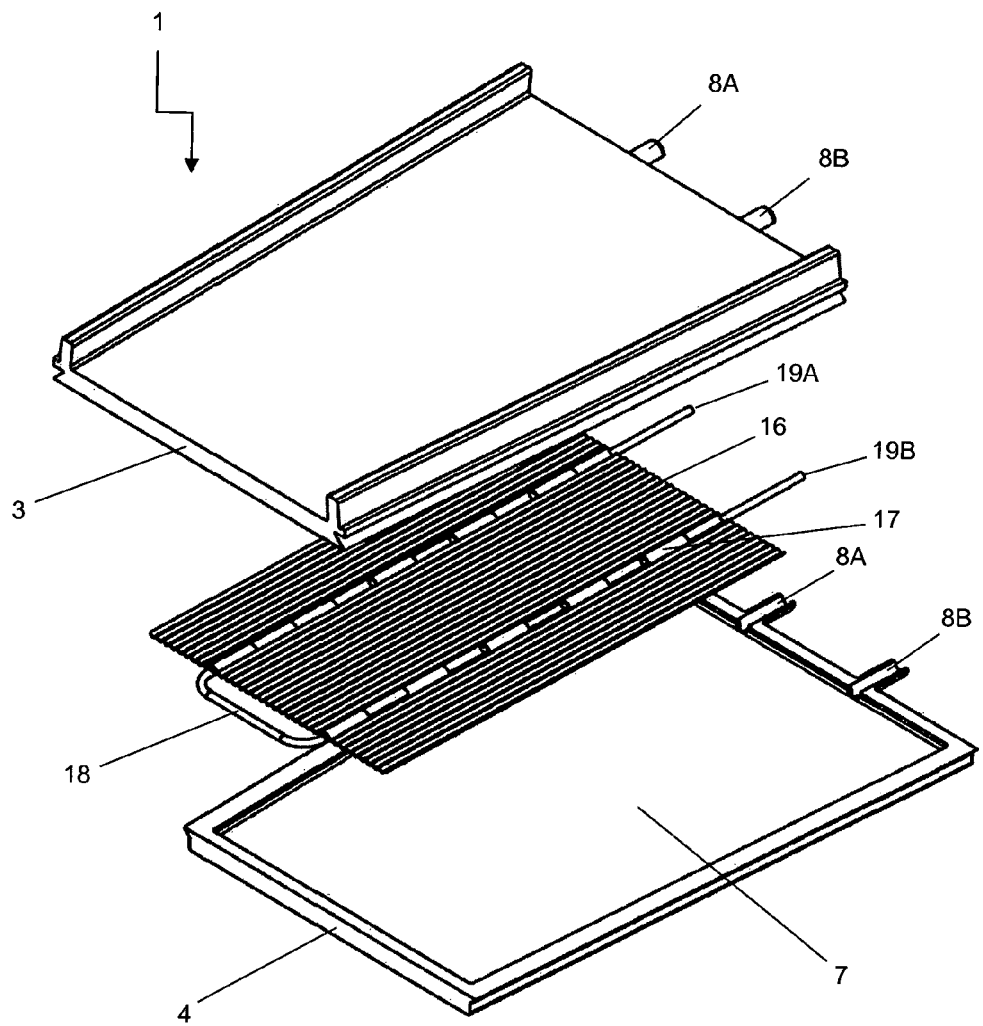
FIG. 14 shows an exemplary heat conductor/heat absorbing plate inserted into the single closed space of the tile depicted in FIG. 1.

FIG. 14 shows the insertion of an exemplary heat conductor/heat absorbing plate into the closed space (7) formed from top section (3) and bottom section (4) of tile (1). The heat conductor/heat absorbing plate is in the form of a fluted aluminium wafer (16) anodised blue/black for optimum heat absorption with up/down saddles (17) to retain a copper staple (18). The copper staple (18) comprises ends (19A, B) which protrude through the evacuation tubes (8A,B). The closed space (7) of the tile (1) is vacuumised in known fashion and the ends (19A,B) of the copper staple (18) are inserted into a corresponding copper socket (not shown) embedded into an insulated copper water pipe (not shown). This configuration allows the transfer of heat through conductivity into a hot water supply without a break in the water pipe. The insulated copper water pipe may run parallel with the roofing tiles and may be collected at the end of the run to be drawn off to a hot water cylinder.

Control of snow melt

The tile may include a modified heat reflecting plate with heat conducting rods which are connected to a closed water system configured to reflect heat back into the outer face of the tile to induce snow melt. An advantage of this configuration is that in colder climates this is a more efficient system than existing methods as it is envisaged that even inside ambient water temperature in the closed water system transmitting warmth through the conductive rods will be sufficient to induce snow melt.

Power generation

Figure 15:
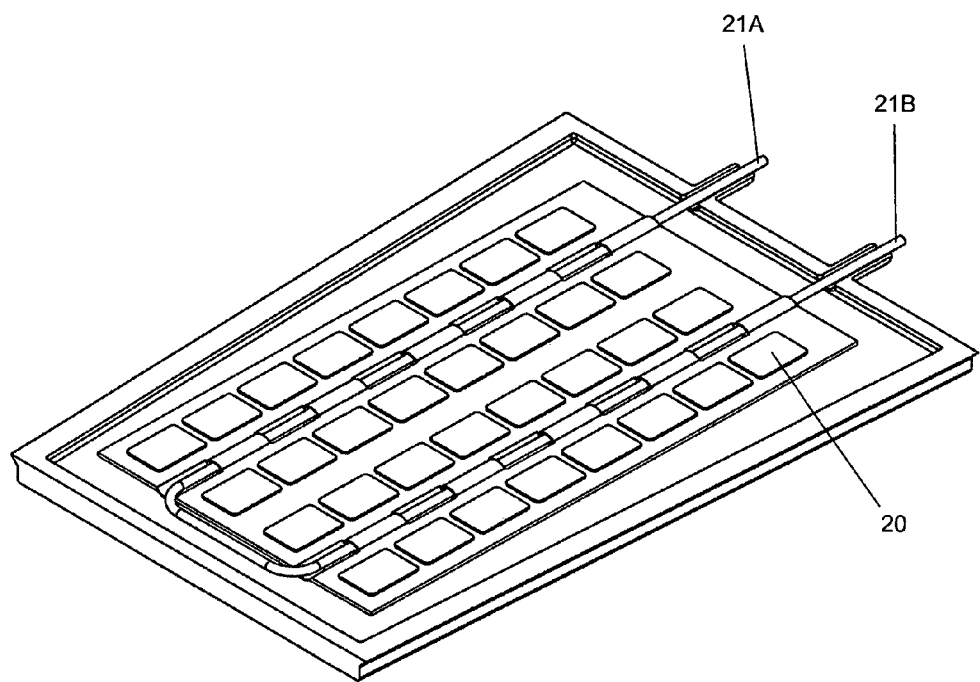
FIG. 15 shows an exemplary voltaic closed space inserted into the single closed space of the tile depicted in FIG. 1.

The tile may include voltaic closed space(s) for the generation of power. For example, FIG. 15 shows an exemplary grid of voltaic closed spaces (20) which include copper connectors (21A,B) (positive and negative) connected to a grid rod under a roof. The voltaic closed spaces (20) are connected to a parallel connection line and are configured to supply either a battery bank inverter system (not shown) or supply energy to a national grid.

The voltaic closed spaces (20) may be retained in position with the same installation method as per the heat absorption plate described above.

Modification of light intensity

The tile may include a photo sensitive liquid crystal plate or equivalent configured to provide reflective colour to the outside in sunlight conditions and the reverse during darkness to reflect light/heat back to a building.

Multi Vacuum Closed Space Tile

Multiple vacuum closed spaces in the form of bubbles (called foam glass) may be introduced during the manufacture of the glass tile by utilising the melt end of glass production.

It is known in the melt end of glass production that if the resulting product is not handled appropriately then a bubble can form in the glass requiring additional refining to remove the bubbles from the glass. Utilising this approach, additional bubbles may be intentionally induced in a glass structure and these bubbles would form vacuum closed spaces (from hundreds to millions depending upon the performance required). In particular, the melt and form temperatures of glass are in the order of 900 to 1,200° C. As the expanded air cools from this temperature range, a vacuum forms as the glass retains its shape. This process increases the strength of the glass from the resultant additional surface tension created by the bubbles and reduces the weight of the resulting tile. Both the properties of increased strength and lighter weight are advantageous in providing the structural support required to hold up a tile roof.

Energy Recovery

Figure 16:
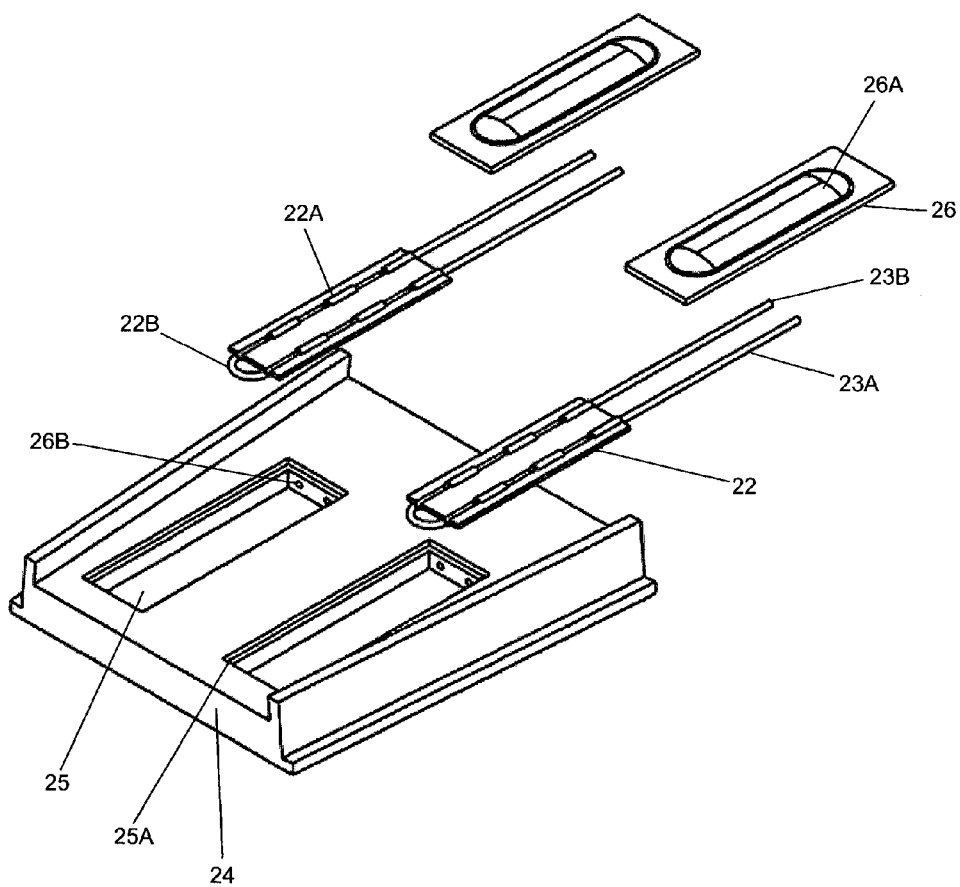
FIG. 16 shows an exploded view of an alternative configuration of the tile depicted in FIG. 14 with energy enhancing covers for the heat conductor/heat absorbing plate inserts.
Figure 17:
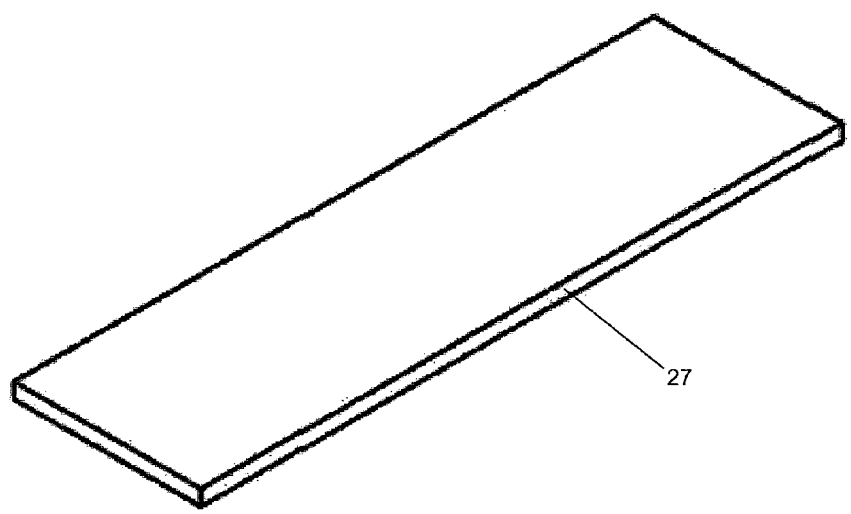
FIG. 17 shows a perspective view of an alternative flat design for an energy enhancing cover as shown in FIG. 16.

Referring to FIG. 16, energy recovery devices such as a pair of aluminium wafers (22) is provided for heat absorption with up/down saddles (22A) to retain a copper staple (22B). The copper staple (22B) comprises ends (23A, B) which protrude through the evacuation holes (26B). Closed spaces (25) which house the wafers (22) are vacuumised in known fashion and the ends (23A,B) of the copper staple (22B are inserted into a corresponding copper socket (not shown) embedded into an insulated copper water pipe (not shown) to provide for heat transfer through conductivity into a hot water supply without a break in the water pipe. The closed spaces (25) are provided with a lip (25A) into which a glass cover (26) is placed. A convex profile to the upper surface (26A) of each glass cover (26) provides a longitudinal magnification effect to the light passing through the cover (26) to direct the focal length of light to a fine light beam onto the aluminium wafers (22) to improve the efficiency of light capture in high light conditions and therefore energy recovery and reduce heat penetration into the roof internal space. The closed spaces (25) are sealed after the glass covers (26) are placed onto the lips (26B) after a vacuum is created in the internal space.

Figure 18:
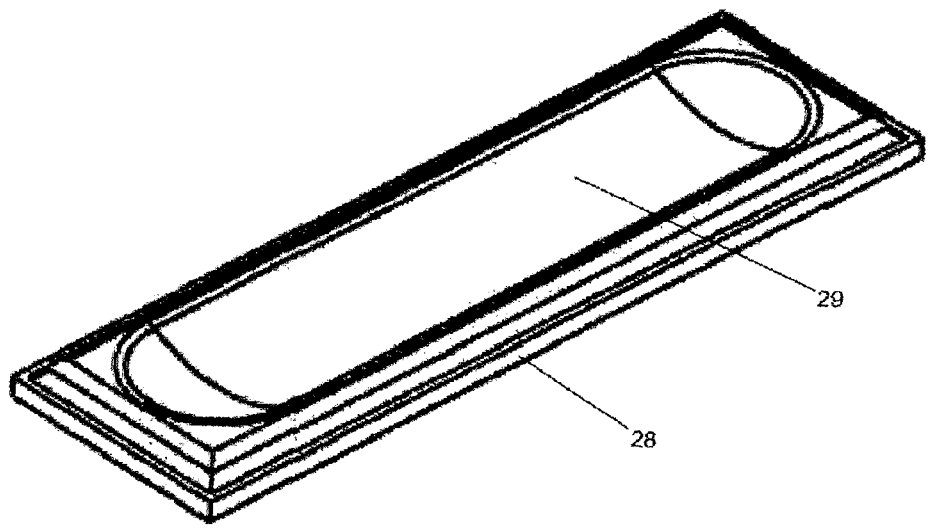
FIG. 18 shows a perspective view of an alternative concave design for an energy enhancing cover as shown in FIG. 16.
Figure 19:
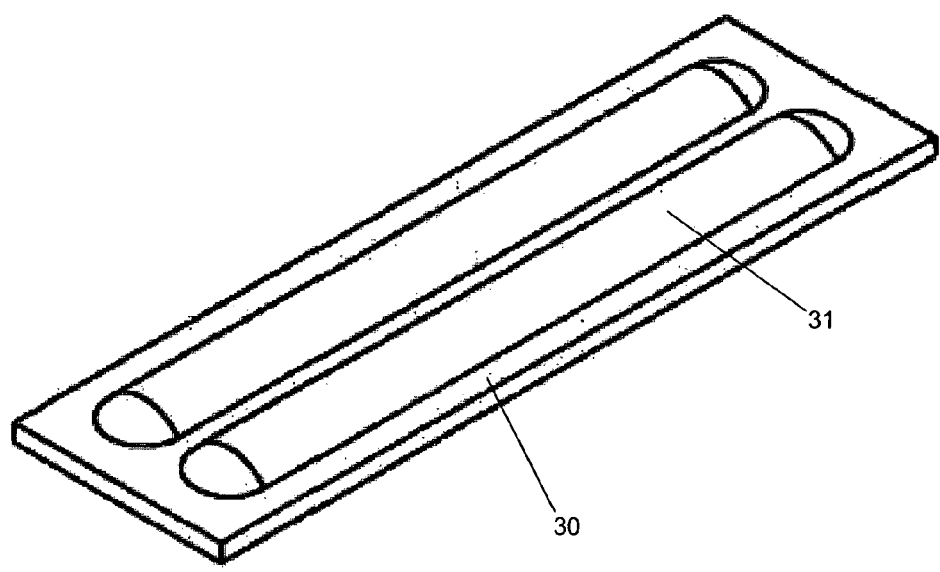
FIG. 19 shows a perspective view of an alternative double convex design for an energy enhancing cover as shown in FIG. 16.
Figure 20:
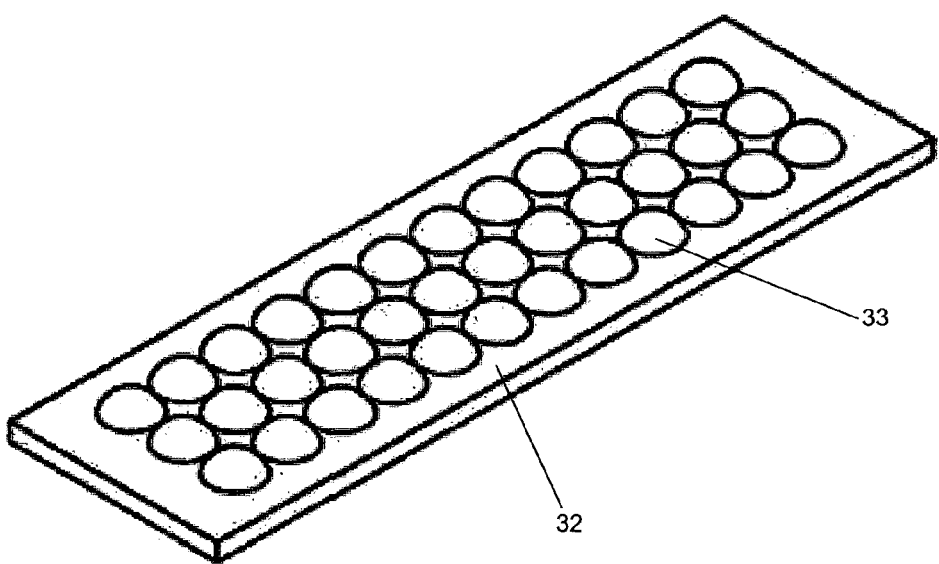
FIG. 20 shows a perspective view of an alternative dimpled design for an energy enhancing cover as shown in FIG. 16.
Figure 21:
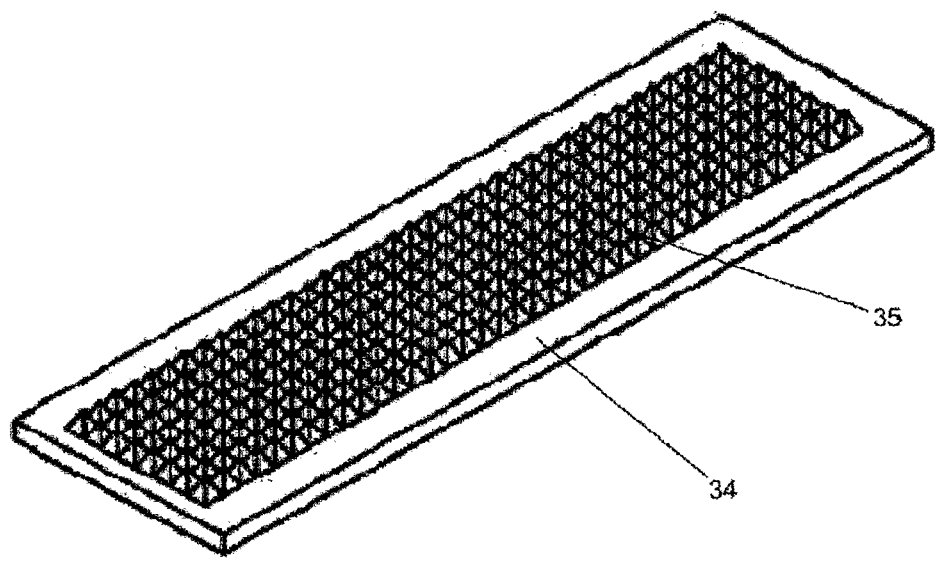
FIG. 21 shows a perspective view of an alternative light scattering design for an energy enhancing cover as shown in FIG. 16.

The glass cover can be varied in shape and pattern depending on the application of the tile. A plain glass cover (27) can be provided for applications where improved efficiency of light capture is not required. Alternatively, the longitudinal magnification effect can also be provided by a glass cover (28) with a concave profile (29) as shown in FIG. 18 to focus light from a wider angle for application to areas with lower light conditions, or a glass cover (30) with at least one convex profile (31) as shown in FIG. 19 for use in areas of higher light conditions. Conventional mushroom magnification can be provided by a glass cover (32) with a profile comprising at least one dimple (33) as shown in FIG. 20. Improved light scattering can be provided by a glass cover (34) with a multi-pyramid profile (35) as shown in FIG. 21. Such a light scattering is suited to a voltaic closed space (a variation of those shown in FIG. 15) where more even light beam over a surface is required.

Equivalents and Variations

Where in the foregoing description reference has been made to integers or components then such equivalents are incorporated herein. It will be appreciated by those skilled in the art that the tile (1) may take different forms without departing from the scope of the present invention. For example the shape and configuration and/or pattern and ornamentation and/or colour of the tile may be varied depending on the aesthetic appeal needed to suit different architectural styles.

It is envisaged that other materials such as clay, aluminium or steel may be used in construction of the tile (1) which provides for a tile with at least one vacuum body sandwiched between additional roof componentry i.e. any such material may be utilised which allows the creation of vacuum closed spaces induced from melt/form temperature to ambient temperature without losing the structural integrity of the vacuum.

Advantages

There are many advantages associated with this invention:

The tile is environmentally friendly. It is manufactured out of recyclable and sustainable material. In particular, the tile is manufactured from recycled glass or silica. In addition, the tile has a positive environmental input (positive carbon footprint) by capturing and conducting the suns energy for use in energy recovery or emission;

The closed space or closed spaces are vacuumised to achieve the thermal quality of the tile such that it achieves a more stable temperature in the ceiling space of a building;

The vacuumised closed spaces provide a sound proofing characteristic for the dampening of rain/hail and other external noises;

The tile is multi-functional as a variety of energy recovery devices such as mirrored reflective panels and voltaic closed spaces etc can be easily integrated into the closed space during manufacture to provide further functionality;

In addition the tile has a positive environmental impact

The body of the tile is economical to manufacture as it is manufactured out of recycled glass; and The tile is easy to install utilising the fastener and locking caps.

Aspects of the present invention have been described by way of example only and it should be appreciated that modifications and additions may be made thereto without departing from the scope thereof as defined in the appended claims.

I claim:

1. A tile for a roof comprising:
   a tile body made, at least in part, of foam glass containing bubbles which on cooling form a vacuum, and
   a vacuumised cavity formed in the tile body and sealed, the tile body having at least one evacuation tube extending between the cavity and a sealed opening in an outer face of the tile body, the cavity being configured to receive an energy recovery means, the at least one evacuation tube being configured to receive a conductor.

2. The tile as claimed in claim 1, wherein the vacuumised cavity contains an energy recovery means and the at least one evacuation tube contains a conductor connected to the energy recovery means and arranged to transfer energy to or from the energy recovery means.

3. The tile as claimed in claim 2, wherein the conductor comprises a pin protruding from the energy recovery means to conduct heat to or from the tile body.

4. The tile as claimed in claim 2, wherein the conductor is a copper or aluminium rod inserted into a socket in an external closed circuit water system.

5. The tile as claimed in claim 2, wherein the tile body has a mirrored reflective surface or panel configured to reflect heat.

6. The tile as claimed in claim 5, wherein the mirrored reflective surface or panel is an aluminium or copper surface.

7. The tile as claimed in claim 2, wherein the energy recovery means comprises a photovoltaic cell.

8. The tile as claimed in claim 7, wherein the photovoltaic cell comprises electrical connectors (positive and negative) connected to a grid rod configured to supply electricity to an energy sink.

9. The tile as claimed in claim 2, wherein the energy recovery means comprises a photo sensitive liquid crystal element configured to reflect energy externally from the roof in light conditions and to the roof area during dark conditions to reflect energy back into a building.

10. The tile as claimed in claim 1, wherein the vacuumised cavity has a transparent cover.

11. The tile as claimed in claim 10, wherein the transparent cover is configured to focus light onto the energy recovery means.

12. The tile as claimed in claim 11, wherein the transparent cover configuration is at least one configuration selected from the group consisting of: a convex profile, a concave profile, and a multi-pyramid profile.

13. The tile as claimed in claim 1, wherein the tile body is manufactured entirely from foam glass.

14. The tile as claimed in claim 13, wherein the tile body is manufactured partially or entirely from recycled glass.

15. The tile as claimed in claim 1, wherein the vacuumised cavity is located between a first and second section of the tile body.

16. The tile as claimed in claim 1, wherein the vacuumised cavity is located between the tile body and a cover.

17. The tile as claimed in claim 16, wherein the tile body has more than one vacuumised cavity, each cavity being configured to receive an energy recovery means.

18. A method of manufacture of a tile for a roof comprising the steps of:
 a) forming a tile body made, at least in part, of foam glass containing bubbles which on cooling form a vacuum with a cavity in the tile body having at least one evacuation tube extending between the cavity and an opening in an outer face of the tile body;
 b) housing an energy recovery means in the cavity and a conductor in the at least one evacuation tube, the conductor being connected to the energy recovery means and arranged to transfer energy to or from the energy recovery means; and
 c) vacuumising the cavity and sealing the cavity and the opening in the outer face of the tile body.

\* \* \* \* \*